United States Patent [19]

Falk

[11] Patent Number: 5,069,320
[45] Date of Patent: Dec. 3, 1991

[54] TORQUE-LIMITING COUPLING DEVICE

[75] Inventor: Curt Falk, Hudiksvall, Sweden

[73] Assignee: Metalform Safeset AB, Hudiksvall, Sweden

[21] Appl. No.: 623,805

[22] PCT Filed: Jun. 29, 1989

[86] PCT No.: PCT/SE89/00371
§ 371 Date: Dec. 21, 1990
§ 102(e) Date: Dec. 21, 1990

[87] PCT Pub. No.: WO90/00231
PCT Pub. Date: Jan. 11, 1990

[30] Foreign Application Priority Data

Jul. 4, 1988 [SE] Sweden ........................ 8802498

[51] Int. Cl.$^5$ .................................. F16D 7/00
[52] U.S. Cl. ...................... 192/56 R; 192/113 B; 464/10; 464/30; 403/15; 403/39
[58] Field of Search ............... 192/56 R, 56 F, 74, 192/79, 107 T, 113 B; 464/10, 30; 403/15, 39

[56] References Cited

U.S. PATENT DOCUMENTS

| 2,277,554 | 3/1942 | McCoy | 192/56 F |
| 2,543,396 | 2/1951 | Wolff | 192/56 R |
| 3,107,765 | 10/1963 | Davies | 192/56 R |
| 3,818,722 | 6/1974 | Vogel | 464/30 |

FOREIGN PATENT DOCUMENTS

| 2225745 | 1/1973 | Fed. Rep. of Germany. |
| 2215053 | 10/1973 | Fed. Rep. of Germany. |
| 2536310 | 9/1976 | Fed. Rep. of Germany. |
| 3638596 | 5/1988 | Fed. Rep. of Germany. |
| 431339 | 6/1974 | U.S.S.R. ........................ 464/10 |

Primary Examiner—Richard Lorence
Attorney, Agent, or Firm—Frishauf, Holtz, Goodman & Woodward

[57] ABSTRACT

A torque-limiting clutch arrangement which comprises a cylindrical part (3) forming part of one clutch element and having shrink-fitted thereon a cylindrical sleeve (5) which forms part of the other clutch element. The clutch arrangement also includes a pump which when one clutch element (3) rotates relative to the other clutch element (5), when the torque on the clutch exceeds a given value, functions to pump oil into the domain of engagement between the cylindrical part (3) and the sleeve (5), so as to form a hydrostatic layer therebetween, the hydrostatic layer essentially negating the friction between the engagement surfaces while the relative movement continues.

11 Claims, 1 Drawing Sheet

TORQUE-LIMITING COUPLING DEVICE

The present invention relates to a torque-limiting clutch arrangement which comprises two mutually coaxial clutch elements which are non-rotatably connected to a driving shaft and a driven shaft respectively and which engage one another through the intermediary of two mutually opposing, pressurized surfaces, therewith forming a friction joint which is dimensioned to slip when the torque on the clutch exceeds a predetermined value; and a device which is operative to detect slip occurrences in the friction joint and to disengage or separate the clutch elements when slip occurs.

Torque-limiting clutches or couplings of this kind are known to the art in many different forms. The clutch normally has the form of a conventional disc-clutch comprising a pressure plate which is applied by means of a powerful spring force When slip occurs, a device comes into function and relieves the pressure on the pressure plate, so as to disengage the clutch. In the case of one simple design, described and illustrated in DE 22 15 053, the spring pressure is generated by compressed-air springs which are pressurized via a compressed-air conduit. This conduit communicates with an outwardly projecting nipple mounted on one clutch element. The nipple is closed at one end and when relative rotation occurs between the two clutch elements, the nipple is punctured by a moveable member provided on the other of said clutch-elements.

Such a clutch arrangement is both complicated and space-demanding, particularly when intended for high torques. Another drawback with a clutch of this kind is that once the clutch is overloaded, so that the clutch is disengaged and the driven shaft has stopped, the clutch cannot be reengaged until the nipple has been replaced and the compressed-air springs repressurized.

The object of the present invention is to provide a clutch of the kind described in the introduction which is of simple and reliable construction and which will remain reliable, even after several years in use; which is particularly adapted for high torques; and which when disengaged under overload conditions is ready for re-use immediately, without needing to replace any of the clutch components or to take any other form of remedial action with respect to the clutch.

SUMMARY OF THE INVENTION

This object is achieved with a clutch constructed in accordance with the invention and having the characteristic features set forth in the following claims. Considered as a clutch arrangement, the inventive arrangement has the simplest and most-compact construction possible, namely a cylindrical sleeve which is clamped rigidly, preferably shrink-fitted, onto a cylindrical part. Moveable parts, i.e. pump means driven by mutual rotation of the cylindrical parts, do not begin to function until slip occurs between the cylindrical parts as a result of an overload Pressure fluid is delivered to a pressure conduit at the requisite pressure, such as to force the fluid through openings provided in at least one of said friction surfaces and produce a hydrostatic layer which separates the two cylindrical parts so that the friction generated therebetween will be at a minimum. Immediately upon cessation of the mutual rotation of said parts, the pump means will cease to operate and the hydrostatic layer is dispersed so as to reestablish frictional contact between the clutch elements A closed pressure-fluid circuit is obtained, by providing drainage channels in at least one of said friction surfaces, said circuit enabling the clutch to be held disengaged over a long period of time, if necessary.

DETAILED DESCRIPTION

Figure 1:
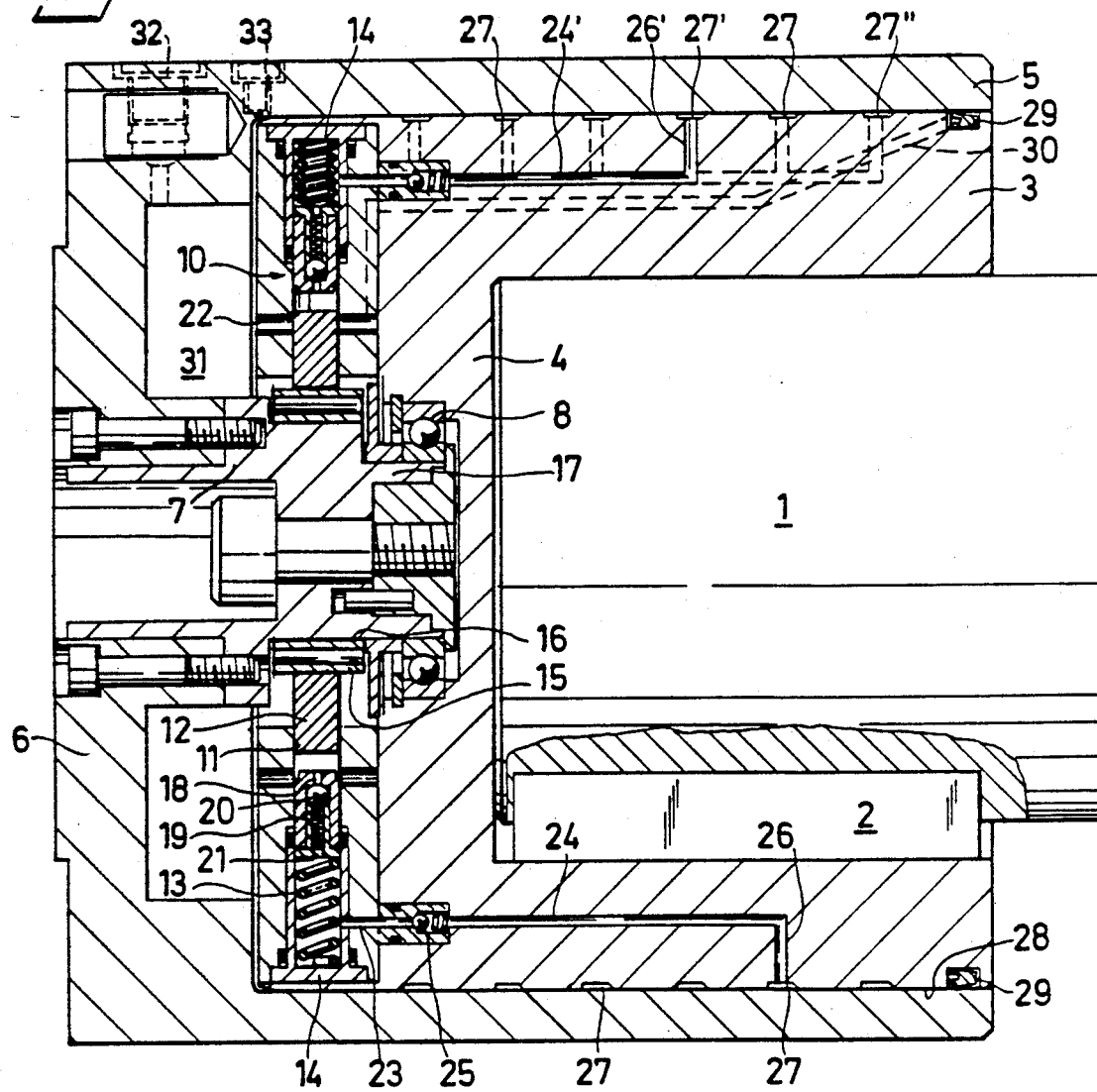
FIG. 1 is a longitudinal sectional view of a preferred embodiment of an inventive clutch arrangement.

Shown in the drawing is a drive shaft 1 which is keyed by a key 2 to a first clutch or coupling element comprising a first cylindrical sleeve 3 which is press-fitted on one end of the drive shaft and the free-end of which has a first hub 4 firmly mounted thereon. A second or outer sleeve 5 having mounted thereon a second hub 6 and belonging to a second clutch element is shrink-fitted on the outer cylindrical surface of the first sleeve 3. The second hub 6 has provided therein a central hole in which there is firmly mounted a journal pin 7, the end of which facing the drive shaft 1 is connected to said shaft through the intermediary of a roller bearing 8. The second hub 6 is configured as a flange-connection for a driven shaft, e.g. a cardan shaft in an electrically driven unit intended for a track-driven vehicle or the like.

The first hub 4 incorporates six radially extending piston pumps 10, serving as pump unit which are uniformly placed around the hub. Each pump includes a radial bore 11 which accommodates a piston 12, said piston being driven by a strong pressure-spring 13, located between the outer end of the piston and a closure 14. The spring 13 presses the inwardly located end of the piston 12 against an outer-ring 15 of a needle-bearing, the inner-ring 16 of which is mounted on an excentric 17 formed on the journal pin 7. The piston 12 is provided in a conventional manner with a suction opening 18, an axial through-flow channel 19, a suction valve 20 mounted in said channel, and a pressure opening 21.

The suction opening 18 communicates with a suction passage 22 which extends axially through the first hub 4, whereas the pressure opening 21 communicates with a pressure passage 23 which also extends through the first hub 4. Located opposite the orifice of the pressure passage 23 is an axial outlet channel 24. The channel 24 incorporates a pressure valve 25 which coacts with the pump 10, in a known manner.

A radial channel 26 connects the outlet channel 24 with a peripheral groove 27 in the outer cylindrical wall 28 of the first sleeve 3. Each of the other five pumps 10 is provided with a peripheral groove, in a corresponding manner. As illustrated in the upper part of FIG. 1, a further outlet channel 24' is connected to a further peripheral groove 27', via a further radial channel 26'. The peripheral grooves 27, 27' are uniformly spaced in the axial direction. Arranged externally of the groove 27" distal from the first hub 4 is a peripheral drainage groove 29 which communicates, via a drainage passage 30, with an annular pressure-fluid storage container 31 located between the clutch elements. The container 31 communicates solely with the suction passages 22 of respective piston pumps 10 and with the drainage passage 30. Two closing devices 32 and 33, not shown in detail, are provided for the purpose of filling the system with pressure fluid, preferably oil, and of ventilating the closed fluid system.

In normal operation, the inventive clutch arrangement functions as a friction clutch having two clutch sleeves which are joined by a shrink-joint, said joint being adapted so that clutch-slip will only occur when the torque applied to the clutch reaches a predetermined, maximum permitted value.

When this value is reached, the first sleeve 3 and the first hub 4 will rotate relative to the second sleeve 5 and the second hub 6 carrying the journal pin 7 and the excentric 17. The pistons 12 will then be forced outwards in succession and with great force, by the excentric needle-bearing 15, 16, and then returned by the springs 13. When the pressure-fluid system is filled with oil, oil will consequently be pressed into the peripheral grooves 27, thereby separating the two sleeves 3, 5 sufficiently to enable the oil to leave the grooves 27 and enter the drainage passage 29, from where the oil flows through the drainage pasage 30 and back to the container 31. There is thus formed between the first and second sleeves 3 and 5 a hydrostatic layer which will permit the sleeves to rotate mutually with only very little friction therebetween.

Slipping between the sleeves 3 and 5 will stop immediately when the torque acting on the clutch has fallen to a sufficiently low level. The pumps 10 will then cease to work and the oil in the grooves 27 will lose its pressure. Consequently, the oil is forced away from the interspace between the grooves 27, and the two sleeves 3 and 5 are then restored to frictional engagement as a result of the shrink joint.

Figure 2:
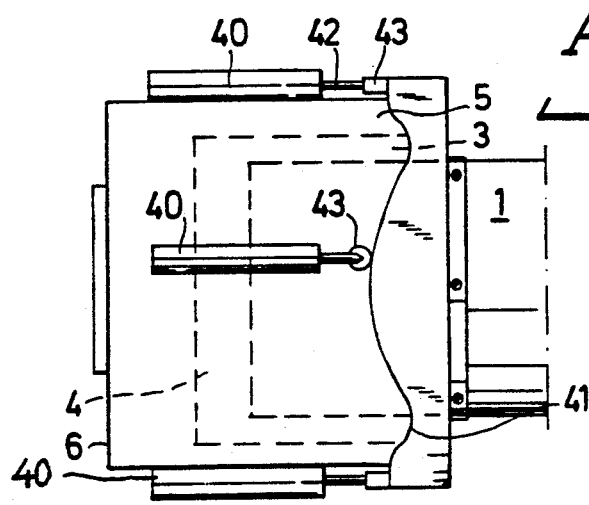
FIG. 2 illustrates schematically alterative positioning of the pump units of said arrangement.

The illustrated and described clutch arrangement is intended primarily for use with rapid-speed clutches or couplings which operate with one pump-stroke per revolution and pump. In the case of slower clutches it may be more expedient to use a cam-curve which enables more pump-strokes to be effected per revolution and pump. In this case, the pump units can then be disposed axially, as shown schematically in FIG. 2. This illustration shows separate piston-pumps 40 mounted externally on the outer or second sleeve 5 of the clutch arrangement, and a cam-curve 41 mounted rigidly on the shaft 1. Piston rods 42 provided with roller-type cam-followers 42 transmit pumping movement from the camcurve 41 to the pistons of the pumps (not shown) when relative movement occurs between the outer sleeve 5 and the shaft 1. With the exception of the pumps 10 and the excentric 17, the clutch shown in FIG. 2 is the same as that shown in FIG. 1, although in the case of the FIG. 2 embodiment it may be expedient to form the peripheral grooves 27 with associated passages in the outer sleeve 5, since the pumps 40 are mounted on said sleeve.

It will be understood that the invention is not restricted to the illustrated and described embodiments and that various modifications can be made within the scope of the invention defined in the following claims, for instance, the piston-pumps 40 of the FIG. 2 embodiment can be mounted in axial bores in the wall of the outer sleeve 5, in a manner corresponding to the pumps 10 in the radial bores 11 provided in the first hub 4. The number of pumps can, of course, vary in dependence on the pressure-fluid requirement.

I claim:

1. A torque-limiting clutch arrangement comprising:
   two mutually coaxial clutch elements which are non-rotatably connected to a driving shaft and a driven shaft respectively and which engage one another through the intermediary of two mutually opposing friction-surfaces pressed against each other and forming a friction-joint which is dimensioned to slip when a torque on the clutch exceeds a predetermined value; and
   a detecting device for detecting slip occurrences in the friction-joint and to disengage the clutch elements when slip occurs;
   said friction-joint comprising:
   a cylindrical part (3) which is rigidly connected to one of said clutch elements and which has press-fitted thereon a cylindrical sleeve (5) which is connected rigidly to the other of said clutch elements;
   a high-pressure pump means (10) which is driven by the detecting device (17) to supply pressure-fluid to an outlet passage (24) when slip occurs in the friction-joint; and
   a plurality of openings (27) formed in at least one of the friction-surfaces and communicating with the outlet pasage (24) of the pump means, said openings being configured to produce a hydrostatic layer together with the friction-surfaces upon the delivery of pressure fluid.

2. A clutch arrangement according to claim 1 wherein:
   said pump means (10) is mounted on one of said elements; and
   said openings (27) connected with the outlet passage (24) of said one clutch element are formed on the friction-surface of the same clutch elements (3, 4).

3. A clutch arrangement according to claim 1 wherein;
   said pump means includes a plurality of piston-pump housings (11) which extend radially and in substantially uniform spaced relationship around the one clutch element (3, 43); and
   said pumps include piston rods (12) having free ends which are configured for axial activation by an excentric (17) mounted on the other of said clutch elements (5, 6), when one clutch element rotates relative to the other clutch element.

4. A clutch arrangement according to claim 2, wherein:
   said pump means includes a plurality of piston-pump housings (11) which extend radially and in substantially uniform spaced relationship around the one clutch element (3, 4); and
   said pumps include piston rods (12) having free ends which are configured for axial activation by an excentric (17) mounted on the other of said clutch elements (5, 6), when one clutch element rotates relative to the other clutch element.

5. A clutch arrangement according to claim 1, wherein at least one of said friction-surfaces is provided with grooves (29) which form drainage passages connected to a suction side (18) of the pump means, to thereby form a closed pressure-fluid circuit.

6. A clutch arrangement according to claim 2, wherein at least one of said friction-surfaces is provided with grooves (29) which form drainage passages connected to a suction side (18) of the pump means, to thereby form a closed pressure-fluid circuit.

7. A clutch arrangement according to claim 3, wherein at least one of said friction-surfaces is provided with grooves (29) which form drainage passages connected to a suction side (18) of the pump means, to thereby form a closed pressure-fluid circuit.

8. A clutch arrangement according to claim 1, further comprising a plurality of separate pump units (10) arranged on a pressure side of the pump means, each pump unit (10) being assigned a given group of openings (27, 27') which communicate solely with a pressure-fluid outlet-passage (24, 24') of an associated pump unit.

9. A clutch arrangement according to claim 2, further comprising a plurality of separate pump units (10) arranged on a pressure side of the pump means, each pump unit (10) being assigned a given group of openings (27, 27') which communicate solely with a pressure-fluid outlet-passage (24, 24') of an associated pump unit.

10. A clutch arrangement according to claim 3, further comprising a plurality of separate pump units (10) arranged on a pressure side of the pump means, each pump unit (10) being assigned a given group of openings (27, 27') which communicate solely with a pressure-fluid outlet-passage (24, 24') of an associated pump unit.

11. A clutch arrangement according to claim 4, further comprising a plurality of separate pump units (10) arranged on a pressure side of the pump means, each pump unit (10) being assigned a given group of openings (27, 27') which communicate solely with a pressure-fluid outlet-passage (24, 24') of an associated pump unit.

* * * * *